United States Patent [19]
Dequesnes et al.

[11] Patent Number: 5,641,047
[45] Date of Patent: Jun. 24, 1997

[54] CLUTCH MECHANISM, NOTABLY FOR MOTOR VEHICLES

[75] Inventors: Laurent Dequesnes, Fouilloy; Raymond Hagnere, Amiens, both of France

[73] Assignee: Valeo, Paris, France

[21] Appl. No.: 338,473

[22] PCT Filed: Apr. 7, 1994

[86] PCT No.: PCT/FR94/00388

§ 371 Date: Nov. 17, 1994

§ 102(e) Date: Nov. 17, 1994

[87] PCT Pub. No.: WO94/24448

PCT Pub. Date: Oct. 27, 1994

[30] Foreign Application Priority Data

Apr. 8, 1993 [FR] France .................. 9304184

[51] Int. Cl.$^6$ .................................. F16D 13/71
[52] U.S. Cl. .................. 192/70.18; 192/109 R; 192/113.24
[58] Field of Search .............. 192/109 R, 70.18, 192/89.23, 89.24, 113.24

[56] References Cited

U.S. PATENT DOCUMENTS

| | | | |
|---|---|---|---|
| 4,577,740 | 3/1986 | Carmillet | 192/70.18 |
| 4,655,334 | 4/1987 | Valier | 192/89 B |
| 4,781,280 | 11/1988 | Huber | 192/70.27 |
| 4,846,330 | 7/1989 | Takeuchi | 192/113 A |

FOREIGN PATENT DOCUMENTS

| | | |
|---|---|---|
| 0183578 | 6/1986 | European Pat. Off. . |
| 1356783 | 2/1964 | France . |
| 2459921 | 1/1981 | France . |
| 2528925 | 12/1983 | France . |
| 2642125 | 7/1990 | France . |
| 3440827 | 6/1985 | Germany . |
| 3632435 | 4/1987 | Germany ............ 192/89.24 |
| 3703663 | 8/1987 | Germany . |
| 2094420 | 9/1982 | United Kingdom . |
| 2222640 | 3/1990 | United Kingdom . |
| 2243654 | 11/1991 | United Kingdom . |

Primary Examiner—Rodney H. Bonck
Attorney, Agent, or Firm—Longacre & White

[57] ABSTRACT

The clutch mechanism has a cover (2), a thrust plate (1), elastic member with axial action (3) for acting on the thrust plate (1), circumferential tongues (5) attached at their ends by fixing devices (6, 8) each respectively to an area (53) on the cover (2) and to a lug (11) on the thrust plate (1), and at least one device (8) for limiting the axial travel of the thrust plate (1), which for this purpose passes through an opening (93) formed in a stop zone (91) on a limitation area (54) of the cover and having a continuous shoulder (81), larger in size than the opening (93), suitable for coming to bear against the stop zone (91). This zone (91) is delimited on the inside by a slot (9) affecting the connecting area (23) and partly extends radially below the limitation area (54), as well as the limitation device (8).

13 Claims, 3 Drawing Sheets

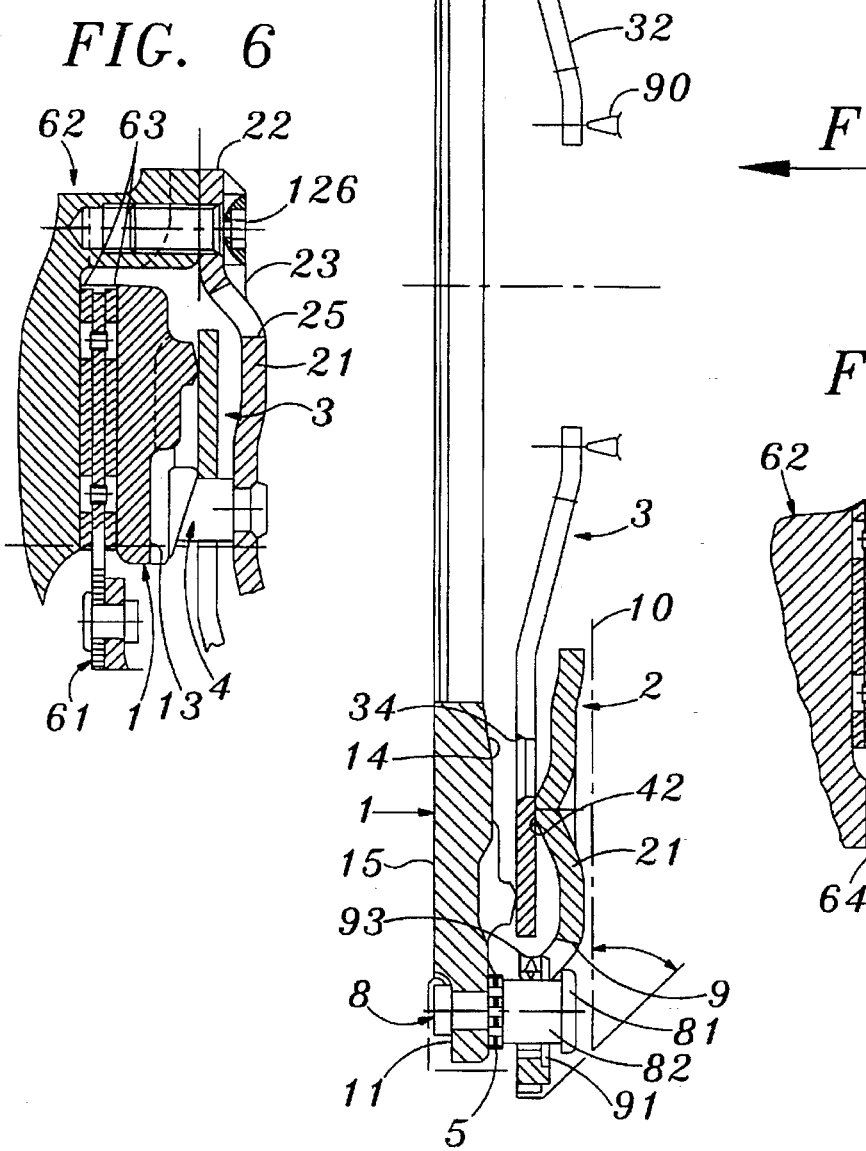
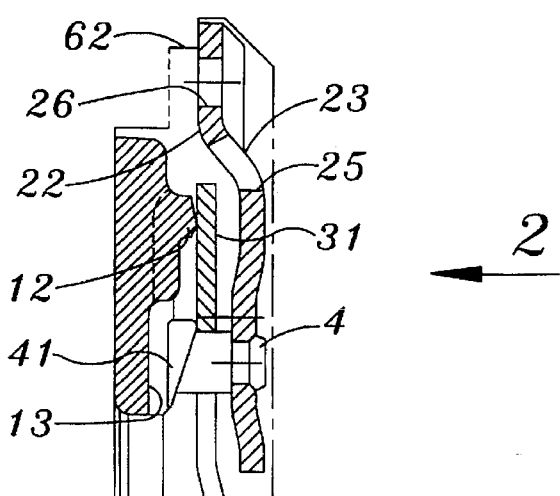
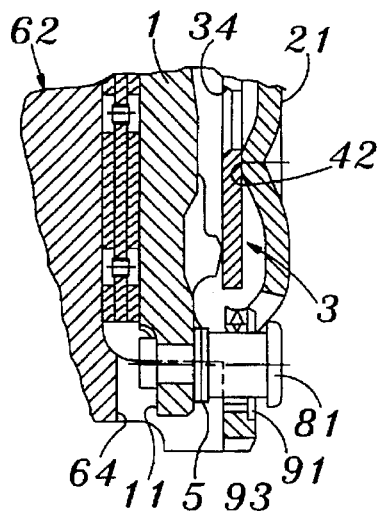

CLUTCH MECHANISM, NOTABLY FOR MOTOR VEHICLES

The present invention concerns clutch mechanisms, notably for motor vehicles, of the type comprising an annular cover having a base connected to a peripheral flange by a connecting area, an annular thrust plate provided with lugs projecting radially outwards, elastic means with axial action bearing on the base of the cover to act on the thrust plate and push the latter in the axially opposite direction to the base of the cover, axially flexible circumferential tongues fixed at their ends, by means of fixing devices, each respectively to a coupling area of the flange of the cover and to a lug on the thrust plate, and at least one means for limiting the axial travel of the thrust plate so as to prevent the latter from moving more than a predetermined distance away from the base of the cover, the said means being integral with a device for fixing the said tongues to the thrust plate and passing through, for this purpose, an opening formed in a stop zone at least partly forming part of a limitation area on the flange of the cover and having a continuous shoulder, larger in size than the said opening, suitable for coming to bear against the said stop zone.

Such a unitary mechanism is described in the document FR-A-867 177. In this, in the storage position (with the mechanism not fixed to its reaction plate), the shoulder cooperates with the edge of its associated opening in order to limit the axial travel of the thrust plate under the action of the elastic means with axial action. The tongues are thus protected and there is no risk that they will be damaged by deformation, notably by their elastic limit being exceeded.

Nonetheless, this limitation means may become a hindrance when the clutch casing, adjacent to the cover, is located in the immediate vicinity of the said cover and more precisely of its peripheral flange comprising fixing areas equipped with fixing holes for the device for fixing the cover or reaction plate of the clutch to pass through and, circumferentially and axially offset with respect to the fixing areas, coupling and limitation areas as alluded to previously. In this case the limitation areas are near to the clutch casing.

For this reason, document FR-A-2 642 125 provided, so as not to change the position and size of the elastic means with axial action, for the creation of a limitation means with a shouldered head, the size of whose upper part is such that it matches the contour of the clutch casing. The result of this is that the shoulder is trimmed so that the bearing surface that the said shoulder offers to the stop zone is reduced.

The object of the present invention is to overcome this drawback and therefore to create, in a simple and economical manner, a novel clutch mechanism, whose cover can be located in the immediate vicinity of the clutch casing, while having a limitation means with a continuous shoulder, and without changing the location of the elastic means with axial action.

According to the invention, a mechanism of the type indicated above is characterised in that the said stop zone is delimited on the inside by a slot affecting the connecting area and partly extends radially below the limitation area, and in that the limitation means partly extends radially below the limitation area.

By means of the slot according to the invention it is possible, considering the document FR-A-2 642 125, to offset the limitation means radially inwards in order to produce a continuous shoulder, without modifying the said elastic means. Thus there is no risk that this shoulder will interfere with the clutch casing and may be located more towards the centre of the mechanism, while the shoulder has a good seating.

Moreover, the elastic means with axial action can be located on the same circumference as in the document FR-A-2 642 125, in such a way that the performance of the clutch, notably the transmissible torque, is not reduced. Moreover, no trimming of the head need be undertaken. The solution is therefore simple and economical.

Advantageously, the slot delimits a tongue extending the limitation area radially inwards and belonging at least in part to the stop zone. Thus the limitation means can be moved a little further towards the centre.

In one embodiment the slot is in the shape of a sector of a circle surrounding the said tongue.

This enables the connecting area to be reduced to a minimum.

Advantageously, the tongue is of a shape tapered in the direction of the axis of the mechanism, such as a trapezoid, in order to reduce the size of the slot and to control the latter better.

In order to give a reduction in the number of parts, further reduction in size, better control of the manufacturing tolerances and therefore better precision in the maximum axial travel of the thrust plate, the limitation means constitutes the head of the relevant device for fixing the tongues to the thrust plate and the shoulder is formed by means of a collar with a bevelled end.

Owing to the bevel, the risks of interference with the clutch casing are further reduced while the shoulder has the same bearing surface.

In order to reduce the axial size of the said head, the thickness of the stop area is reduced, thereby enabling the depth of the cover to be reduced. It is then possible to reduce the axial dimension, while at the same time having a means of limiting the minimum size dictated by the functional movement of the thrust plate.

It will be noted that in the storage position the shoulder is housed at least in part in the stop area so that the projecting part of the limitation means is of reduced size, or even nil. This shoulder is thus less accessible and there is no risk of a person being injured by handling the mechanism.

Advantageously, to reduce the axial size of the limitation means, the supports of the diaphragm are formed by dished areas formed in the cover and by the heads of small columns, the thrust plate having hollows facing the small columns.

This enables the stresses in the material of the thrust plate to be reduced, the inner face of the lugs (serving as a support for the tongues) being coplanar with the inner face of the thrust plate turned towards the base of the cover.

The inner face of the stop zone, turned towards the thrust plate, is then coplanar overall with the outer face of the diaphragm, also turned towards the said plate.

The description that follows illustrates the invention with reference to the accompanying drawings in which:

FIG. 1 is a view in axial section of a clutch mechanism according to the invention;

Figure 2:
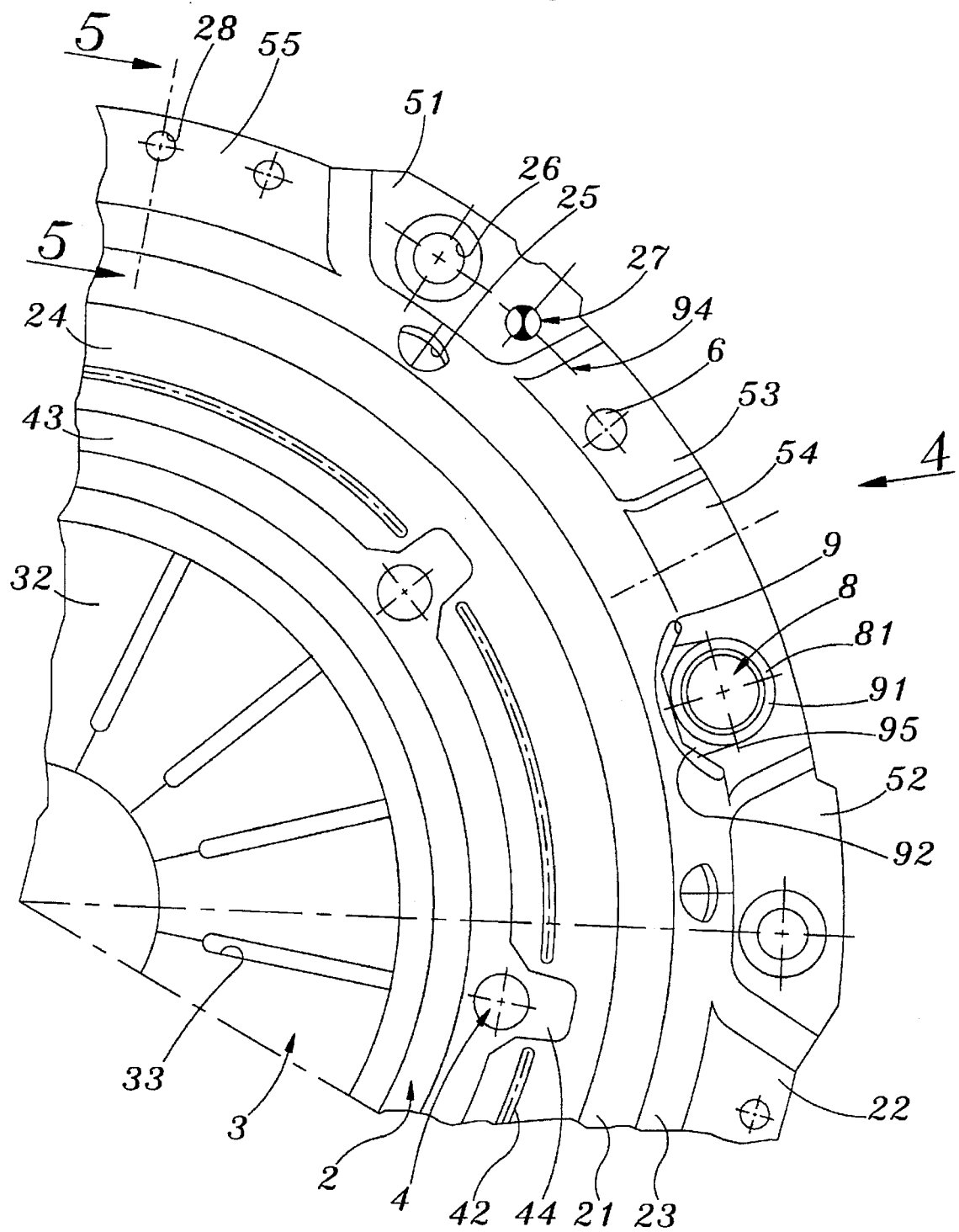
FIG. 2 is a partial view in the direction of the arrow 2 in FIG. 1.
Figure 4:
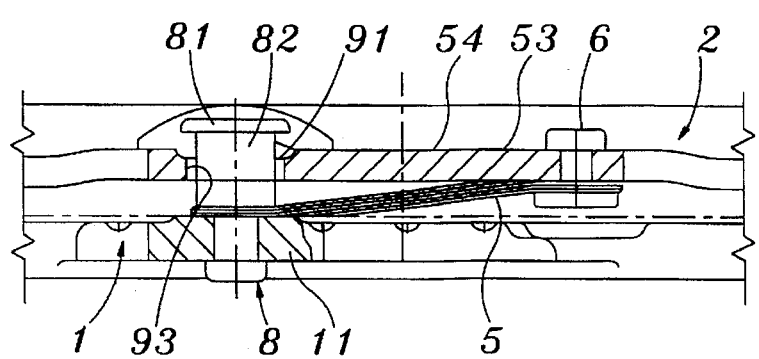
Figure 5:
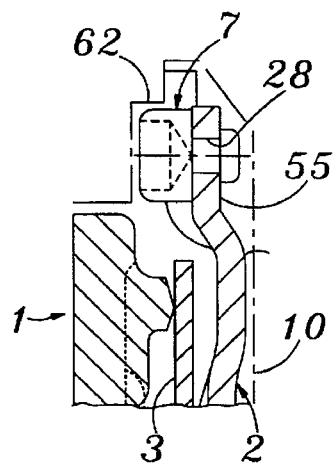

FIG. 4 view in cross section in the direction of the arrow 4 in FIG. 2;

FIG. 5 is a view in cross section along the line 5—5 in FIG. 2;

FIG. 6 partial view in axial section showing part of the reaction plate with the top part of FIG. 2 of its clutch mechanism;

FIG. 7 is a partial view in axial section showing part of the reaction plate with the bottom part of FIG. 2 of its clutch mechanism.

In the figures a clutch mechanism for a motor vehicle is illustrated, forming a unitary assembly suitable for being attached by the peripheral flange 22 of a cover 2 to the reaction plate 62 of the clutch. For this purpose, in a manner known per se, the flange 22 is equipped with fixing holes 26 through which devices such as screws 126, rivets or bolts, for fixing to the reaction plate 62 (FIG. 6), can pass.

More precisely, this mechanism is of the type comprising an annular cover 2 having a base 21 connected to a peripheral flange 22 by a connecting area 23, an annular thrust plate 1 provided with lugs 11 projecting radially outwards, elastic means with axial action 3 bearing on the base 21 of the cover 2 to act on the thrust plate 1 and push the latter in the axially opposite direction to the base 21 of the cover 2, axially flexible circumferential tongues 5 fixed at their ends, by fixing devices 6, 8, each respectively to a coupling area 53 of the flange 22 of the cover 2 and to a lug 11 of the thrust plate 1, and at least one means 8 for limiting the axial travel of the thrust prate 1 so as to prevent the latter from moving more than a predetermined distance away from the base of the cover, the said means 8 being integral with a device 8 for fixing the said tongues 5 to the thrust plate 2 and for this purpose passes through an opening 93 formed in a stop zone 91 of a limitation area 54 of the flange 22 of the cover and having a continuous shoulder 81, larger in size than the said opening 93, suitable for coming to bear against the said stop zone. Here the peripheral flange 22 of the cover therefore comprises fixing areas 51, 52, equipped with fixing holes 26 through which fixing devices 126 for the cover 2 or reaction plate 62 of the clutch may pass and, circumferentially and axially offset with respect to the fixing areas 51, 52, the aforementioned coupling 53 and limitation 54 areas.

This mechanism is characterised in that the said Stop zone 91 is delimited on the inside by a slot 9 affecting the connecting area 23, and partly extends radially below the limitation area 54, and in that the limitation means partly extends radially below the limitation area 54.

By virtue of this device the limitation means 8 is here located on a median circumference 95 (FIG. 2) whose diameter is smaller than that of the median circumference 94 on which are located the fixing holes 26, as well as, in the usual manner, the alignment holes 27 for the alignment pins carried by the reaction plate 62.

According to one characteristic, the limitation means 8 thus partly extends radially below the limitation area 54 concerned and also radially below the fixing areas 51, 52. Here, the limitation means 8 partly extends radially below the fixing devices 126 and the fixing holes 26.

The slot delimits a tongue 92 extending the limitation area 54 radially inwards. The tongue 92 belongs, in this case for the most part, to the stop zone 91. It is radially tapered in the direction of the axis of the mechanism, being trapezoid in shape in this case. This arrangement enables the connecting area 23 to be affected as little as possible and therefore enables the strip of material separating the slot 9 from the outer periphery of the base 21 of the cover 2 to be increased. The slot 9 surrounds the tongue 92 and has the overall shape of an annular sector. The ends of the slot 9 are semi-circular in shape, in order to reduce incipient fractures, and are linked to the inner edge of the limitation area 54, which thus retains all its radial range.

The slot 9 has, in its median or central part, a reduced width because of the presence of the tongue 92. The limitation means 8 is thus radially offset more towards the axis of the mechanism without the strength of the cover 2 with slots 9 being reduced.

A good seating is, moreover, given to the shoulder 81 and the thickness of the stop zone 91 is reduced compared with the thickness of the limitation area 54. Here, in order to form the zone 91, material is trimmed from the outer face, turned in the opposite direction to the thrust plate 1, of the area 54.

The width of this zone 91, formed by means of the outer face of the area 54, is less than that of the tongue 92 in order to give strength to the area 54. In the storage position the shoulder 81 is therefore housed in the zone 91.

More precisely, the cover 2 is here made from pressed sheet metal, being in the shape of a dinner plate.

Production of the cover 2 by pressing leads to the formation of steps or areas at the flange 22. This flange 22 thus has circumferentially, in alternation and axially offset, fixing areas 51, 52 suitable for coming into contact with the reaction plate 62, coupling areas 53 for the tongues 5, limitation areas 54 and balancing areas 55.

In this case, three balancing areas 55, three limitation areas 54 (and therefore three zones 91), three coupling areas 53 and six fixing areas 51, 52 are provided axially in succession, the areas 55 being closest to the base 21.

As can be seen in FIGS. 2 and 5, the areas 55, which are shallow axially, are provided with holes 28 for locating rivets 7 for the dynamic balancing of the clutch mechanism.

At 10 the contour of the clutch casing can be seen. These areas are evenly distributed circumferentially. Between two consecutive areas 55 (FIG. 2) a fixing area 51, an area 53, an area 54 and a fixing area 52, the latter differing from the area 51 solely by virtue of the absence of holes 27, are to be found circumferentially.

The slots 9, small in size owing to the tongues 92, make it possible to create, in the connecting area 23, rounded in shape, ventilation holes 25 level with the fixing holes 26, on the areas 51, 52.

The elastic means with axial action 3 may consist of helical springs as in the document FR-A-867 177, but here, in order to reduce the number of parts and the axial dimension, they consist of a diaphragm 3. This diaphragm 3 has a peripheral part 31, shaped like a Belleville washer, and a central part divided into radial fingers 32 by slots 33, one end of which, of reduced width, opens into a common central opening, and the other end of which forms a blind orifice 34 adjacent to the Belleville washer 31, to allow small pivoting columns 4 to pass through the diaphragm 3.

The columns 4 have a foot, for fixing by riveting to the base 21 of the cover, and a head 41 profiled so as to offer a secondary support for the diaphragm. Facing this secondary support, the base 21 has a primary support in the form of a dished area 42, in this case split up. The outer peripheral part of the Belleville washer 31 bears on a projection 12, divided into annular sections, on the thrust plate 1, and its inner peripheral part bears on the supports 41, 42.

The small columns 4 are of the type described in the document FR-A-1 524 350 (U.S. Pat. No. 3,499,512), their head 41, whose cross section is wedge-shaped (FIG. 1), having a rounded top edge for localised contact with the Belleville washer 31. This edge has the shape of an arc of a circle centred on the axis of symmetry of the mechanism.

The feet of the small columns 4 are located by means of a flat annular area of the base 21. This area 43 is axially offset in the direction of the thrust plate 1 with respect to the main part of the base 21. This area 43 is formed by means of a hollow area 24, which the base 21 has at its inner periphery.

It will be noted that the area 43 has tabs 44 on the same level as the small columns 4, the said tabs 44 extending radially outwards beyond the dished area 42, through which it passes by means of the gaps in the said dished area 42 (FIG. 2).

The small columns 4 are thus located below the dished area 42 without the geometry of the latter being affected by the presence of the said small columns 4, which thus find a good seating because of the area 43 and tongues 44.

In a manner known per se, the diaphragm is thus pivotally mounted between these tilt supports 41, 42, and in order to declutch it is necessary to act by pushing in the direction of the arrow F (FIG. 1) using a clutch release bearing, partially shown at 90, in order to cause the diaphragm to tilt so that the thrust plate 1 is able to move closer to the base 21 under the return action exerted by the elastic tongues 5. The action of the diaphragm 3 on the plate 1 is thus cancelled and the clutch disengaged.

In fact, as shown in the figures, the clutch is normally engaged and the diaphragm 3, bearing on the dished area 42 and on the projection 12, pushes the plate 1 in the opposite direction to the base 21, to grip the friction linings 63 (FIG. 6), carried by a clutch disk 61, between the thrust plate 1 and the reaction plate 62, or more precisely between the outer face 15, turned in the opposite direction to the base 21, of the thrust plate 1 and the reaction plate 62.

The plate 62 is fixed with respect to rotation to the crankshaft of the internal combustion engine of the vehicle, either by being fixed directly to it, or by being coupled by a torsion damper to a plate fixed to the said crankshaft. The disk 61 is fixed with respect to rotation, usually by means of a fluted mounting, to the input shaft of the gearbox.

Thus, the mechanism being mounted on the plate 62 by its flange 22 and the screws 126, the torque is normally transmitted from the motor to the disc 61, the pressure plate 1 being connected with respect to rotation to the cover 2, with axial mobility, by means of the tongues 5.

During the declutching operation, the diaphragm pivots and pushes against the heads 41, an operating clearance being provided between the supports 41, 42 and the diaphragm 3.

In the storage position (with the mechanism not mounted on the plate 62), the shoulder 81, by cooperating with the area 91, limits the movement of the plate 1. It will be noted that it is the diaphragm 3 which limits movement towards the centre of the zone 91, thus extending radially above the diaphragm 3.

The limitation means 8 may consist, as in FIGS. 7 and 8 of the document FR-A-867 177, of a shouldered piece secured to the plate 1 by the fixing devices 8 of the tongues 5, but here the said means is in a single piece with the said devices 8.

The devices 6, 8 for fixing the ends of the tongues 5, respectively to the coupling areas 53 and to the lugs 11, may consist of screws or other means. Here they consist of rivets.

The rivet 8 thus forms a small limitation column and has a head 82 passing with clearance through the opening 93 in order to have an annular end collar 81, larger in size than the opening 93, and formation of the shoulder according to the invention.

Before the unitary clutch mechanism is mounted on the plate 62 (in storage), the collar bears on the stop zone 91 in order to limit the movement of the thrust plate 1 under the action of the diaphragm and protect the tongues 5.

It will be noted that the top part of the zone 91 is, consequently, rounded.

After mounting, the diaphragm 3 and the small columns 8 occupy the position shown in the FIGS. 1, 4, 6 and 7 when the linings 63 are new. It can be seen that the casing of the clutch, shown schematically at 10, can come very close to the flange 22 of the cover without interference with the columns 8.

When the linings 63 wear, the plate 1 moves away from the base 21. With each disengagement of the clutch, this plate 1 moves nearer the base 21.

The reduction in thickness of the stop zone 91 thus enables the length of the head 82 to be reduced to the minimum necessary for the movement of the thrust plate during functioning. This reduction in thickness therefore enables the clutch casing to move closer to the limitation areas 54.

The collar 81 is bevelled in order to further reduce the axial dimension and, notably, to match the contour 10 of the clutch casing, having a sloping part on the outer periphery of the cover.

The bevelled collar 81 is located at the connection between this sloping part and the normal transverse part of the contour 10.

Because of the small columns 4, the depth of the cover can be reduced so that, when the linings 63 are new, the inner face of the area 54 (and of the zone 91), turned towards the thrust plate 1, is coplanar overall with the outer face of the Belleville washer 31 of the diaphragm 3, turned towards the thrust plate 1.

For this purpose the thrust plate 1 is provided with hollows 13 facing the heads 41 of the small pivoting columns 4.

This arrangement makes it possible to reduce the distance between the inner face 14, turned towards the base 21 of the cover 2, of the plate 1 and the said base, in combination with the area 43 formed by means of a hollow 24 in the base 21 of the cover 2.

In order to reduce stresses in the material of the thrust plate, while reducing the length of the head 82, the lugs 11 are located in such a way that the inner faces, turned towards the base 21, of the thrust plate and of the lugs 11, are coplanar.

Figure 3:
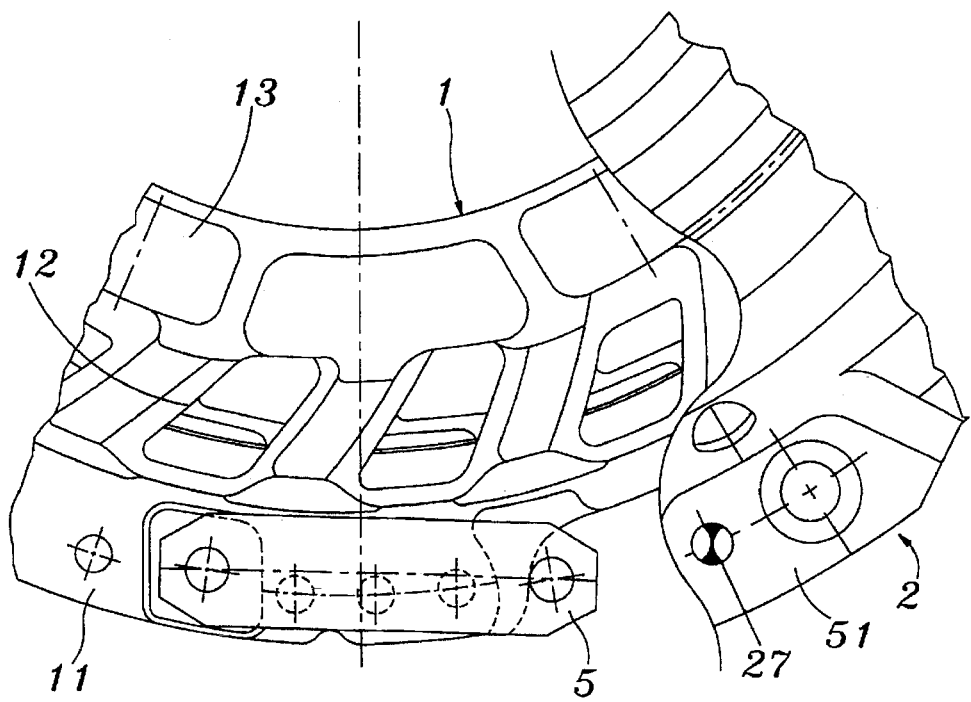
FIG. 3 is a partial view of FIG. 2 cut away locally to show the tangential tongues.

As can be seen in FIGS. 1 and 3, the said inner face 14 of the plate 1 is also hollowed out between two hollows 13. The inertia of the plate 1 is thus reduced, and this plate 1 is well ventilated by means of the projection 12, split into sloping fins, and the holes 25.

In order to further reduce the size, the fingers 32 of the diaphragm (FIG. 1) are sloped in the direction of the base 21. These fingers thus have three zones, namely a first zone in the plane of the washer 31, a second, sloping zone, and a third zone, transverse overall for the action of the stop 90.

By virtue of all these devices, an axially very compact clutch mechanism is obtained, with a thrust plate of reduced thickness, while the required declutching travel is available.

It will be noted that the annular reaction plate 62 is hollow in shape and therefore has on its outer periphery an axially orientated skirt provided with serrations 64 (FIG. 7) for the passage of the lugs 11 of great circumferential width (FIG. 3) carrying the flexible tongues, in this case several elastic tongues stacked on top of each other. These tongues have tapered circumferential ends, here trapezoid in shape, and extend, in a manner known per se, tangentially overall in order to reduce size.

Of course, the present invention is not limited to the example embodiment described. In particular, the tilt supports may be formed in a different way and may consist, for example, of a multiplicity of small columns carrying pivot rings between which the diaphragm is inserted.

As a variant, arrangements may be provided having assembly tabs and crown-rings.

Of course, the present invention is applicable to a clutch of the pulled type, as described in the document FR-A-1 580 169 (U.S. Pat. No. 3,489,256), in which the Belleville washer 31 of the diaphragm bears at its outer periphery on a support carried by the base of the cover in the vicinity of its connecting area 23 and its inner periphery on a support carried by the thrust plate.

In order to de-clutch, then, the ends of the fingers 32 of the diaphragm must receive a traction force.

Of course, the shoulder 81 may be rectangular, hexagonal or otherwise in shape. In this case, the shape of the stop zone matches the shape of the shoulder in order to enable the latter to be housed, at least in part, in the stop zone.

We claim:

1. Clutch mechanism for being attached to a reaction plate of a clutch comprising an annular cover (2) having, on the one hand, a peripheral flange (22) having fixing areas (51, 52), provided with fixing holes (26) through which devices (126) for fixing to the reaction plate (62) can pass, and, circumferentially and axially offset with respect to said fixing areas (51, 52), coupling areas (53) and limitation areas (54), and, on the other hand, a base (21) connected to the peripheral flange (22) by a connecting area (23), and an annular thrust plate (1) provided with lugs (11) projecting radially outwards, elastic means with axial action (3) bearing on the base (21) of the cover (2) to act on the thrust plate (1) and push the latter in the axially opposite direction to the base (21) of the cover (2), axially flexible circumferential tongues (5) fixed at their ends, by means of fixing devices (6, 8), each respectively to coupling area (53) of the flange (22) of the cover (2) and to a respective one of said lugs (11) of the thrust plate (1), and at least one limitation means (8) for limiting the axial travel of the thrust plate (1) so as to prevent the latter from moving more than a predetermined distance away from the base of the cover, wherein said limitation means (8) is integral with a device (8) for fixing the tongues (5) to the thrust plate (1) and passes through, for this purpose, an opening (93) formed in a stop zone (91) at least partly forming part of a limitation area (54) of the flange (22) of the cover and having a continuous shoulder (81), larger in size than said opening (93), suitable for coming to bear against the stop zone, wherein the stop zone (91) is delimited inwardly radially by a slot (9) affecting the connecting area (23) and partly extends radially inwardly of the limitation area (54), in that the limitation means (8) partly extends radially inwardly of the limitation area (54), and the limitation means (8) is located on a median circumference (95) whose diameter is smaller than that of the median circumference (94) on which the fixing holes (26) are located.

2. Clutch mechanism according to claim 1, wherein the slot (9) delimits a tongue (92) extending the limitation area (54) radially inwards and belonging at least in part to the stop zone (91).

3. Clutch mechanism according to claim 2, wherein the slot (93) is in the shape of a sector of a circle surrounding the tongue (92).

4. Clutch mechanism according to claim 2, wherein the circumferential ends of the slot (93) are connected to the inner edge of the limitation area (54).

5. Clutch mechanism according to claim 2, wherein the tongue (92) is radially tapered in the direction toward the axis of the mechanism and the slot (9) has a shape of an annular sector.

6. Clutch mechanism according to claim 1, wherein a thickness of the stop zone (91) is smaller than the thickness of the limitation area (54).

7. Clutch mechanism according to claim 6, in which the limitation means (8) is in a single piece with its associated fixing device (8) forming a small limitation column (8) passing through the opening (93) in the stop zone (91) and having an annular end collar (81) forming the said continuous shoulder (81), wherein a top part of the stop zone (91) is rounded.

8. Clutch mechanism according to claim 6, wherein a slot (9) delimits a tongue (92) extending the limitation area (54) radially inwards, and in that the width of the stop zone (91) is less than that of the tongue (92).

9. Clutch mechanism according to claim 1, in which the shoulder (81) is formed by means of a collar (81), on the limitation means (8), in a single piece with its associated fixing device (8), wherein the collar (81) is bevelled.

10. Clutch mechanism according to claim 1, wherein the connecting area (23) has ventilation holes (25) located on the same level as the fixing holes (26).

11. Clutch mechanism for being attached to a reaction plate of a clutch comprising an annular cover (2) having, on the one hand, a peripheral flange (22) having fixing areas (51, 52), provided with fixing holes (26) through which devices (126) for fixing to the reaction plate (62) can pass, and, circumferentially and axially offset with respect to said fixing areas (51, 52), coupling areas (53) and limitation areas (54), and, on the other hand, a base (21) connected to the peripheral flange (22) by a connecting area (23), and an annular thrust plate (1) provided with lugs (11) projecting radially outwards, elastic means with axial action (3) bearing on the base (21) of the cover (2) to act on the thrust plate (1) and push the latter in the axially opposite direction to the base (21) of the cover (2) for gripping a plurality of friction linings carried by a clutch disc (61) between the thrust plate and the reaction plate, axially flexible circumferential tongues (5) fixed at their ends, by means of fixing devices (6, 8), each respectively to coupling area (53) of the flange (22) of the cover (2) and to a respective one of said lugs (11) of the thrust plate (1), and at least one limitation means (8) for limiting the axial travel of the thrust plate (1) so as to prevent the latter from moving more than a predetermined distance away from the base of the cover, wherein said limitation means (8) is integral with a device (8) for fixing the tongues (5) to the thrust plate (1) and passes through, for this purpose, an opening (93) formed in a stop zone (91) at least partly forming part of a limitation area (54) of the flange (22) of the cover and having a continuous shoulder (81), larger in size than said opening (93), suitable for coming to bear against the stop zone, wherein the stop zone (91) is delimited inwardly radially by a slot (9) affecting the connecting area (23) and partly extends inwardly of the limitation area (54), in that the limitation means (8) partly extends radially below the limitation area (54), and the limitation means (8) is located on a median circumference (95) whose diameter is smaller than that of the median circumference (94) on which the fixing holes (26) are located, wherein the limitation means (8) is in a single piece with its associated fixing device (8), the elastic means consist of a diaphragm (3) bearing on a split projection (12) on the thrust plate (1), an inner face, turned towards the thrust plate (1), of the stop zone (91), is coplanar overall with an outer face, turned towards the thrust plate (1, of the diaphragm (3) when the mechanism is mounted, on its associated reaction plate (62), while gripping the friction linings (63).

12. Clutch mechanism according to 11, wherein a plurality of inner faces, turned towards the base (21) of the cover (22), of the thrust plate (1) and of the lugs (11) of the thrust plate are coplanar.

13. Clutch mechanism according to claims 11, wherein the diaphragm (3) is pivotally mounted between a head (41), whose cross section is in the form of a wedge, of a small column (4), and a split dished area (42) in the base of the cover (2) and in that the thrust plate (1) has hollows (13) facing the heads (41) of the small columns.

* * * * *